United States Patent [19]

Myllymäki

[11] Patent Number: 4,989,236
[45] Date of Patent: Jan. 29, 1991

[54] TRANSMISSION SYSTEM FOR TELEPHONE COMMUNICATIONS OR DATA TRANSFER

[75] Inventor: Matti Myllymäki, Espoo, Finland
[73] Assignee: Sostel Oy, Espoo, Finland
[21] Appl. No.: 294,390
[22] Filed: Jan. 6, 1989
[30] Foreign Application Priority Data Jan. 18, 1988 [FI] Finland .................. 880189

[51] Int. Cl.$^5$ .............................................. H04L 5/14
[52] U.S. Cl. ...................................... 379/98; 379/406; 379/389; 370/32
[58] Field of Search ................... 379/93, 97, 65, 66, 379/98, 406, 407, 389, 390; 370/29, 30, 32, 32.1, 20, 26

[56] References Cited

U.S. PATENT DOCUMENTS

| 2,980,769 | 4/1961 | Lawsine et al. | 379/344 |
| 4,052,562 | 10/1977 | Andersen | 379/389 |
| 4,326,287 | 4/1982 | Abramson | 370/29 |
| 4,595,803 | 6/1986 | Wright | 370/26 |
| 4,731,798 | 3/1988 | Dirr | 370/20 |

FOREIGN PATENT DOCUMENTS 2136313 2/1972 Fed. Rep. of Germany .

Primary Examiner—Jin F. Ng
Assistant Examiner—Stella L. Woo
Attorney, Agent, or Firm—Marshall & Melhorn

[57] ABSTRACT

The invention concerns a transmission system for telephone communications comprising at least two telephone sets, each incorporating a microphone and a receiver and/or loudspeaker, and a telephone line connecting the telephone sets by at least two conductors in order to form a current loop. Connected to the current loop is an alternating-current generator and current-steering switch elements arranged to steer the current to be routed during the positive half-cycles generated by the generator via the microphone circuit of the first set and the receiver and/or loudspeaker circuit of the second set as well as to steer the current during the negative half-cycles via the receiver and/or loudspeaker circuit of the first set and the microphone circuit of the second set, whereby voice transmission takes place by sampling the microphone signals of the interconnected telephone sets and transmitting the alternate signal samples superimposed on the generator signal so that the microphone signal of the first set is superimposed on the positive half-cycles of the generator signal while the microphone signal of the second set is superimposed on the negative half-cycles of the generator signal. The invention is also applicable to data transmission, wherein the telephone sets are replaced by modems of a simple construction.

16 Claims, 2 Drawing Sheets

TRANSMISSION SYSTEM FOR TELEPHONE COMMUNICATIONS OR DATA TRANSFER

This invention concerns a transmission system for telephone communications comprising at least two telephone sets, each provided with a microphone and a receiver and/or loudspeaker, a telephone line connecting the sets over two conductors in order to form a current loop, an AC generator attached to the current loop as well as current path switching circuits, which are adapted to steer the current to be routed during the positive half-cycles generated by the generator via the microphone circuit of the first set and the receiver and/or loudspeaker circuit of the second set as well as to steer the current during the negative half-cycles via the receiver and/or loudspeaker circuit of the first set and the microphone circuit of the second set, whereby voice transmission takes place by sampling the microphone signals of the interconnected telephone sets and transmitting the alternate signal samples superimposed on the generator signal so that the microphone signal of the first set is superimposed on the positive half-cycles of the generator signal while the microphone signal of the second set is superimposed on the negative half-cycles of the generator signal.

The invention also concerns a transmission system for data transfer, which differs from the transmission system for telephone communications only by replacing the telephone sets with modems, which incorporate interfaces for incoming and outgoing data signals.

A general aim of the invention is to provide a transmission system for telephone communications, which system utilizes such a novel telephone communications format that offers simplification of the telephone set and switching equipment as well as simpler interfacing with digital transmission systems than possible so far. An application of the invention to data transmission aims to provide a modem with a significantly simplified construction.

Currently used in the art are both the traditional analog and the more recently evolved digital transmission formats for telephone signals, both of which comply with the CCITT and PR regulations. Intercom systems incorporate voice channels of the type described above, frequently complemented with different kinds of control signals.

In an analog network, the telephone sets are powered over the same conductors that are use for the transmission of voice information. Voice signal transmission is implemented using bidirectional current signals The voice signal directions are separated at the telephone set end with the help of a so-called antisidetone network, and the signal levels are controlled by an automatic level control loop. When an analog telephone set is connected to a digital telephone exchange, a converter is required for each extension at the exchange end.

In a digital network, communications is implemented using a pulse-coded signal transmitted over a two- or four-wire line. A compatible telephone set incorporates the necessary analog and digital signal converters as well as the PCM interface.

In both cases the digital telephone communications always requires analog and digital converters at the subscriber's set together with a PCM interface, at either the telephone set or the exchange equipment. For these reasons, the cost of a subscriber connection becomes excessively costly, particularly in small systems.

Intercom systems require a loudspeaker function for establishing a connection, whereby the antisidetone network used in conventional telephone technology is often ineffective and necessitates the use of an alternating simplex communication scheme, or alternatively, separate lines for incoming and outgoing voice signals.

A drawback of analog telephones is the high cost of a high-quality antisidetone network, requiring a relatively complex circuitry in, e.g., a loudspeaker telephone, while yet remaining far from the desired ideal performance of an automatic level control in differing conditions. Further, complicated subscriber line converters are required in conjunction with digital telephone exchanges.

Digital telephone sets equally necessitate the use of expensive and complicated technology.

Correspondingly, intercom systems require several line pairs for configuring a connection. For example, a bidirectional intercom system known from a US patent publication requires at least five conductors between the sets, while hybrid transformers are used to superimpose an AC voltage on the current loop of the connection.

The object of the invention is to provide a transmission system for telephone communications, in which system the use of a novel, simple telephone communications format makes it possible to achieve an almost ideal antisidetone network in combination with level control, combined with a remarkably simplified interfacing to digital technology, thus simplifying the circuitry of a telephone set for both its basic as well as loudspeaker functions so that a significant reduction in the cost of a telephone set results.

This object of the invention is achieved in accordance with the invention therein that the current control elements described above are connected between a current loop comprising but two conductors, and a microphone circuit and a receiver and/or loudspeaker circuit at the telephone sets so as to prevent bidirectional current paths between the microphone circuit and the receiver and/or loudspeaker circuit within a single telephone set, while allowing only a unidirectional current path of the current loop through said circuits. A similar application of the invention to a data transmission system is possible through replacing the telephone sets by modems as stated in claim 2 later.

As known from the theory of PCM communications, a sampling frequency of at least twice the highest signal frequency component provides information transfer at no essential corruption of the signal. A preferred sampling frequency is in the range 8...20 kHz. Preliminary tests have been run using an 8 kHz sampling frequency.

Further, with the use of a transmission system according to the invention for telephone communications, simpler designs result in special applications such as intercom systems intended for use in the noninstitutional care of elderly people, which systems can be implemented with more straightforward circuitry, thereby achieving higher reliability.

In the following, a telephone communications system, or alternatively, a data transmission system according to the invention, together with the applicable communications format, will be examined in greater detail with references to the attached drawings, in which FIG. 1 shows a simplified wiring diagram of a telephone communications system comprising a telephone exchange equipment section, a line, and a telephone set.

Figure 1:
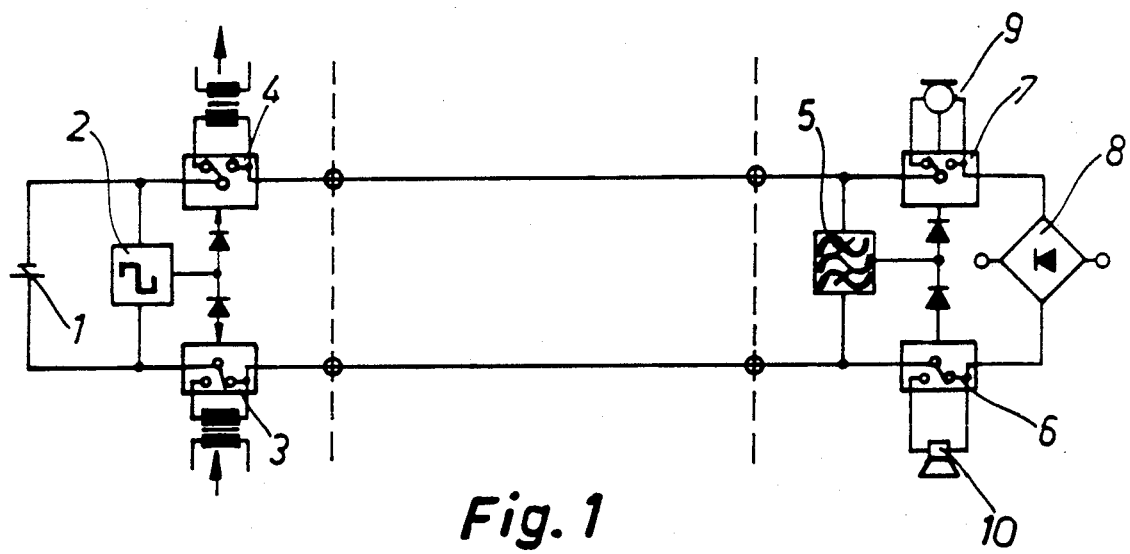

In the application illustrated in FIG. 1, the telephone exchange section comprises a DC voltage supply 1, which provides power feed over the line to the telephone set via a rectifier bridge 8. The DC voltage supply is not indispensable but instead, power feed can be arranged using an AC generator 2.

The basic function of the square-wave generating AC generator 2 is to feed a so-called sampling frequency onto the line that controls switches 3, 4, 6, and 7 at both the exchange section and the telephone set. The frequency generated by the generator 2, namely the sampling frequency, may be set equal to that used in PCM equipment, or 8 kHz. The generator 2 is also used for sending the ring signal at a lower frequency.

Alternation between speech directions is achieved by switching between the ON and OFF states of the switches in synchronization with the sampling frequency. At the exchange equipment, the generator 2 controls the switches 3 and 4, while at the telephone set a bandpass filter 5 controls the switches 6 and 7. The center frequency of the bandpass filter 5 is set equal to the sampling frequency. The filter 5 may be replaced by simple diodes when the DC supply 1 is omitted.

For the outgoing speech direction from the exchange equipment toward the telephone set, the positive half-cycle of the sampling frequency switches onto the line the outgoing signal amplifier of the exchange equipment and the incoming signal amplifier of the telephone set, thus making it possible to transfer the signal sample in a current signal form.

During the incoming speech direction from the telephone set toward the exchange equipment, the negative half-cycles of the sampling frequency are used in a similar manner for transferring the speech signal samples.

Figure 2:
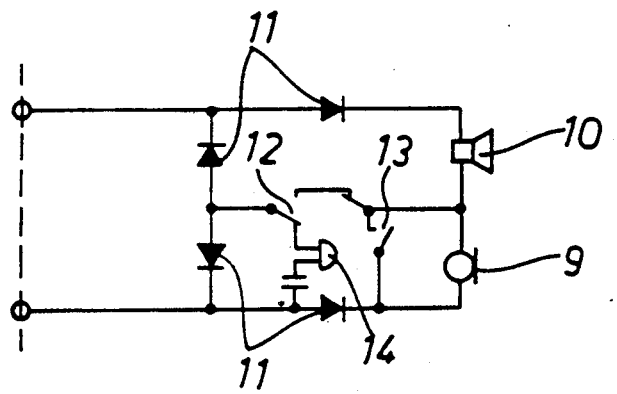
FIG. 2 shows a functional circuit diagram of a telephone set.

Illustrated in FIG. 2 is a circuit diagram of a fully functional telephone set implemented omitting the bandpass filter which is then replaced by diodes 11. In addition, the telephone set comprises the following basic components: a hook switch 12, dial switches 13, a ring circuit 14, and a conventional receiver 10 and a microphone 9. Level control is implemented at the exchange equipment side by means of a slowly-varying constant current control, which is insensitive to audio-frequency signal components.

Figure 3:
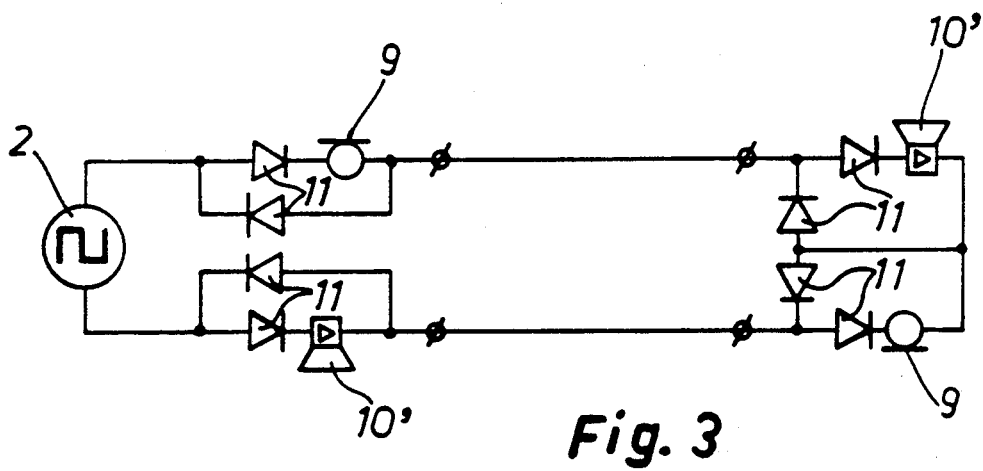
FIG. 3 shows a circuit diagram of a special application of the system into an intercom set.

A transmission system according to the invention for telephone communications can be used in a multitude of applications that require speakerphone functions yet avoiding singing, including such as access control intercoms, door entrance intercoms, office intercoms, lift intercoms and distress call telephones in noninstitutional care. FIG. 3 illustrates a simplified circuit diagram of an apparatus suitable for these applications. The diodes 11 are configured to act as current switch elements, which during the first half-cycle of the generator 2 frequency steer the current via the microphone of the first telephone set as well as via the loudspeaker 10' of the second telephone set, while during the negative half-cycles the current is steered via the loudspeaker 10' of the first telephone set and via the microphone 9 of the second telephone set. Accordinqly, this configuration implements voice transmission by sampling of the microphone signals superimposed on the generator signal so that the microphone signal of the first telephone set is superimposed on the positive half-cycles of the generator signal, while the microphone signal of the second telephone set is superimposed on the negative half-cycles of the generator signal. The loudspeakers 10' are provided with amplifiers for boosting the current signal level.

Figure 4:
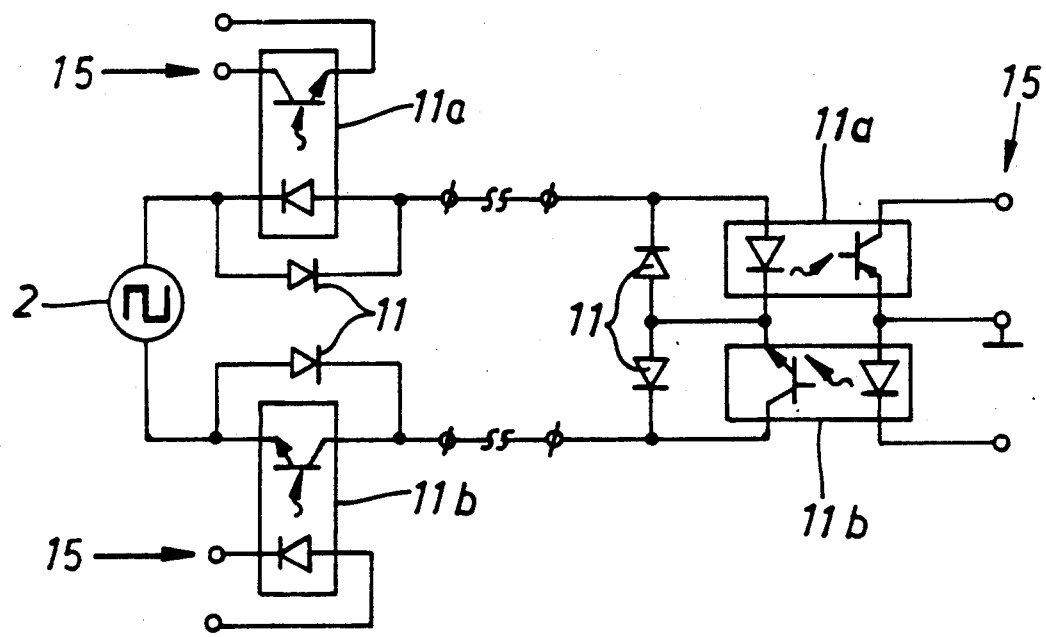
FIG. 4 shows a circuit diagram of a data transmission system according to the invention.

Analogously, the invention can be used for implementing a remarkably simple modem for data transmission. Illustrated in the embodiment shown in FIG. 4 are two modems communicating over a paired line. Both modems incorporate an interface 11a for the incoming data signal and an interface 11b for the outgoing data signal as well as diodes 11 for steering the loop current according to its polarity to be routed via either the incoming signal interface or the outgoing signal interface, respectively. The sampling frequency is created by the AC generator 2. The modems are attached via logic-level compatible serial interfaces 15 to computer apparatuses. It will be evident from the foregoing that data transmission occurs in the loop formed by paired line in a simultaneously bidirectional manner using a similar sampling and current switching principle as depicted in conjunction with the description elucidating the telephone communications system.

The invention concerns a transmission system comprising at least two communications sets which each incorporate means for receiving and transmitting incoming and outgoing communications signals respectively connected by a paired line loop, an alternating-current signal generator, and current-steering switch elements which implement communications signal transfer by means of samples taken alternatingly from the communications signals of the interconnected communications sets that are transmitted superimposed on the generator signal so that the outgoing communications signal of the first set is superimposed on the positive half-cycles of the generator signal and the outgoing communications signal of the second set is superimposed on the negative half-cycles of the generator signal, characterized in that said current-steering switch elements are arranged to steer the current during the positive half-cycles of the generator signal to be routed via the transmitting means of the first set and the receiving means of the second set, bypassing the receiving means of the first set and the transmitting means of the second set, and to steer the current during the negative half-cycles of the generator signal to be routed via the receiving means of the first set and the transmitting means of the second set, while correspondingly bypassing the transmitting means of the first set and the receiving means of the second set. The communications sets can be telephone sets or speakerphone intercoms for voice communications, or modems for data communications. The current-steering switch elements can be switches responsive to the generator signal polarity or diodes. In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A transmission system for telephone communications comprising at least two telephone sets, each incorporating microphone (9) and a receiver and/or loudspeaker (10), a telephone line connecting the telephone sets by two conductors in order to form a current loop, an alternating-current signal generator (2) and current-steering switch elements (3, 4; 6, 7 or 11) connected to the telephone sets and the conductors, arranged to steer the current to be routed during the positive half-cycles generated by the generator via the microphone circuit (9) of the first set and the receiver and/or loudspeaker circuit (10) of the second set as well as to steer the current during the negative half-cycles via the receiver and/or loudspeaker circuit (10) of the first set and the microphone circuit (9) of the second set, whereby voice transmission takes place by sampling the microphone signals of the interconnected telephone sets and transmitting the alternate signal samples superimposed on the generator signal so that the microphone signal of the first set is superimposed on the positive half-cycles of the generator signal while the microphone signal of the second set is superimposed on the negative half-cycles of the generator signal, characterized in that said current-steering switch elements are connected between a current loop comprising but two conductors, and a microphone circuit (9) and a receiver and/or loudspeaker circuit (10) at the telephone sets so as to prevent bidirectional current paths between the microphone circuit and the receiver and/or loudspeaker circuit within a single telephone set, while allowing only a unidirectional current path of the current loop through said circuits.

2. A system as claimed in claim 1 characterized in that the alternating-current generator (2), whose frequency is used as the sampling frequency, is connected to a current-loop, which includes the current-switching elements (3, 4; 11) of the second telephone set.

3. A system as claimed in claim 1, characterized in that the alternating-current generator is a square-wave generator.

4. A system as claimed in claim 1, in which system the current loop connecting the telephone sets is routed via a telephone exchange, characterized in that the alternating-current generator and a part of the current-switching elements are placed at the exchange equipment.

5. A system as claimed in claim 1, characterized in that the current-switching elements are diodes (11).

6. A system as claimed in claim 1, characterized in that the current-switching elements incorporate a bandpass filter (5).

7. A system as claimed in claim 1, characterized in that the current-switching elements incorporate switches (3, 4; 6, 7), placed separately at both ends of both current-loop conductors and configured so that at any time, two switches (3 and 4 or 6 and 7, respectively) belonging to a single telephone set are synchronized to operate pair-wise in such a manner that while one pair (6; 3) forms a bypass route for the telephone circuit (10) current, the other pair (7; 4) connects the telephone circuit (9) associated with the switch pair onto the current loop.

8. A telephone set compatible with the system claimed in claim 1, characterized in that the telephone set terminals to be attached to a paired telephone line are electrically connected to a microphone (9) and a receiver and/or loudspeaker (10, 10') by means of current-switching elements (11), which are configured so that current path via the microphone circuit (9) in the current loop of the line is unidirectional bypassing the receiver and/or loudspeaker circuit (10'), while the current path via the receiver and/or loudspeaker circuit (10') is counter-directionally unidirectional bypassing the microphone circuit (9).

9. A transmission system comprising at least two communications sets which each incorporate means for receiving and transmitting incoming and outgoing communications signals respectively connected by a paired line current loop, an alternating-current signal generator connected to generate current in the current loop, and current-switching elements connected to each of the communications sets which implement communications signal transfer by means of samples taken alternatingly from the communications signals of the interconnected communications sets, said communications signal samples being transmitted superimposed on the generator signal so that the outgoing communications signal of the second set is superimposed on the negative half-cycles of the generator signal and the outgoing communications signal of the second set is superimposed on the negative half-cycles of the generator signal, characterized in that said current-switching elements are arranged to steer the current during the positive half-cycles of the generator signal to be rout ed via the transmitting means of the first set and the receiving means of the second set, bypassing the receiving means of the first set and the transmitting means of the second set, and to steer the current during the negative half-cycles of the generator signal to be routed via the receiving means of the first set and the transmitting means of the second set, while correspondingly bypassing the transmitting means of the first set and the receiving means of the second set.

10. A system as claimed in claim 9 wherein the alternating-current signal generator, whose frequency is used as the sampling frequency, is connected to the current loop which includes the current-steering elements of the second communications set.

11. A system as claimed in claim 9 wherein the alternating-current signal generator is a square-wave generator.

12. A system as claimed in claim 9 wherein the current loop connecting the communications sets is routed via a telephone exchange, characterized in that the alternating-current signal generator and a portion of the current-steering switch elements are located at the telephone exchange.

13. A system as claimed in claim 9 wherein the current-steering switch elements are diodes.

14. A system as claimed in claim 9 wherein the current-steering switch elements incorporate switches placed separately at both ends of both current loop lines and configured so that at any time two of the switches belonging to each communications set are synchronized to operate together in such a manner that while one switch forms a bypass route for the current for the receiving means, the other switch connects the transmitting means with the current loop.

15. A system as claimed in claim 9 wherein the communications sets are telephone sets attached to a paired telephone line as the current loop, the telephone sets each having a microphone as the transmitting means and a receiver and/or loudspeaker as the receiving means connected to the current-steering switch elements and configured so that a current path via the microphone in the current loop of the telephone line is unidirectional bypassing the receiver and/or loudspeaker, while the current path via the receiver and/or loudspeaker is counter-directionally unidirectional bypassing the microphone.

16. A system as claimed in claim 9 wherein the communications sets are modems attached to the paired line as the current loop, the modems each having an outgoing interface as the transmitting means and an incoming interface as the receiving means connected to the current-steering switch elements configured so that a current path via the incoming interface in the current loop of the paired line is unidirectional bypassing the outgoing interface, while the current path via the outgoing interface is counter-directionally unidirectional bypassing the incoming interface.

* * * * *